United States Patent [19]
Collier-Hallman et al.

[11] Patent Number: 6,122,579
[45] Date of Patent: Sep. 19, 2000

[54] ELECTRIC POWER STEERING CONTROL WITH TORQUE RIPPLE AND ROAD DISTURBANCE DAMPER

[75] Inventors: Steven James Collier-Hallman, Frankenmuth; Ashok Chandy, Fenton, both of Mich.

[73] Assignee: Delphi Technologies, Inc., Troy, Mich.

[21] Appl. No.: 09/322,389

[22] Filed: May 28, 1999

[51] Int. Cl.$^7$ .................................................. B62D 5/04
[52] U.S. Cl. ........................... 701/41; 318/432; 318/433; 180/6.2; 180/6.24; 180/234; 180/400; 180/412; 180/446
[58] Field of Search ............................... 701/41; 180/400, 180/408, 421, 422, 446, 6.2, 6.24, 234, 412, 413; 200/DIG. 39; 318/432

[56] References Cited

U.S. PATENT DOCUMENTS

| | | | |
|---|---|---|---|
| 5,444,622 | 8/1995 | Takeshima et al. | 701/41 |
| 5,448,482 | 9/1995 | Yamamoto et al. | 701/41 |
| 5,668,721 | 9/1997 | Chandy | 701/41 |
| 5,668,722 | 9/1997 | Kaufmann et al. | 701/41 |
| 5,704,446 | 1/1998 | Chandy et al. | 180/446 |
| 5,719,766 | 2/1998 | Bolourchi et al. | 701/42 |

OTHER PUBLICATIONS

"Development of Electric Power Steering", Yasuo Shimizu and Toshitake Kawai, Honda R&D Co., Ltd., #910014, pp. 105–119, Date Unknown.
"The Next Generation of Vehicle Power Steering" NSK–RHP, Apr., 1997, pp. 1–7.
"Electric Power Steering (EPS)", Honda Accord Brochure, Japan, 1998, pp. V–6 thru V–12, No Month.

*Primary Examiner*—William A. Cuchlinski, Jr.
*Assistant Examiner*—Yonel Beaulieu
*Attorney, Agent, or Firm*—Edmond P. Anderson

[57] ABSTRACT

An electric power steering control for a motor vehicle reduces motor torque ripple and road generated disturbances communicated to the vehicle handwheel while promoting system stability. In deriving an output command torque signal to the EPS motor, the control (1) derives an electric motor speed signal, (2) differentiates the electric motor speed signal, (3) stores a schedule of gain as an increasing function of electric motor torque, (4) modifies the differentiated estimated electric motor speed signal in response to the gain to provide a damping correction value and (5) derives the output command signal responsive to the damping correction. In a preferred embodiment, the control (1) stores power assist torque data as a function of handwheel torque and vehicle velocity, (2) provides a vehicle velocity signal, (3) provides a handwheel torque signal, (4) modifies the handwheel torque signal in response to the damping correction value, (5) derives a power assist torque value from the stored power assist torque data in response to the vehicle velocity signal and the modified handwheel torque signal and (6) derives the output command signal from the power assist torque value. The control may use an electric motor voltage signal as an estimate of electric motor speed and, for high torque loads, may use the pulse on-time parameter in a pulse width modulated, current switching control to represent the voltage of the controlled electric motor, and therefore the estimate of electric motor speed, so that no additional sensor is needed. The control may use separate stored relationships between the pulse width on-time and electric motor voltage for different commutation modes of the pulse width modulated, current switching control.

16 Claims, 6 Drawing Sheets

ELECTRIC POWER STEERING CONTROL WITH TORQUE RIPPLE AND ROAD DISTURBANCE DAMPER

TECHNICAL FIELD

The technical field of this invention is electric power steering controls for motor vehicles.

BACKGROUND OF THE INVENTION

An electric power steering (EPS) system provides an electric motor coupled to the steering gear and responsive to driver torque input through the steering column to provide power assist. Many electric motors, including trapezoidal back EMF brushless DC motors used for some EPS systems, provide torque ripple in their output. Although the torque ripple can be made sufficiently small that it would not be considered a problem in most applications, the motor output in many EPS systems is provided to a steering component closely coupled to the operator handwheel; and even small torque ripple can be felt by the vehicle operator in high torque assist steering modes such as low speed parking maneuvers. In addition, various road generated disturbances may be transmitted through the steerable wheel and steering gear to the handwheel, where they are also felt by the operator.

SUMMARY OF THE INVENTION

The invention is an electric power steering control for a motor vehicle in which torque ripple communicated to the vehicle handwheel, as well as some road generated disturbances, is reduced. The control is used in a power steering control having a steerable wheel, an operator handwheel, steering gear linking the steerable wheel to the operator handwheel and an electric motor coupled to the steering gear. The control derives an output command torque signal in response to an operator input torque applied to the handwheel and controls current in the electric motor in response to the output command torque signal to provide steering assist torque.

In deriving the output command torque signal, the control of the invention (1) derives an electric motor speed signal, (2) differentiates the electric motor speed signal, (3) stores a schedule of gain as an increasing function of electric motor torque, (4) modifies the differentiated estimated electric motor speed signal in response to the gain to provide a damping correction value and (5) derives the output command signal responsive to the damping correction value to reduce torque ripple effects in the handwheel generated by the electric motor and road generated torque disturbances introduced to the handwheel through the steerable wheel.

In a preferred embodiment, the control (1) stores power assist torque data as a function of handwheel torque and vehicle velocity, (2) provides a vehicle velocity signal, (3) provides a handwheel torque signal, (4) modifies the handwheel torque signal in response to the damping correction value, (5) derives a power assist torque value from the stored power assist torque data in response to the vehicle velocity signal and the modified handwheel torque signal and (6) derives the output command signal from the power assist torque value. Advantageously, the control may use an electric motor voltage signal as an estimate of electric motor speed to eliminate the expense of a motor speed sensor. Advantageously, for high torque loads, the control may use the pulse on-time parameter in a pulse width modulated, current switching control to represent the voltage of the controlled electric motor, and therefore the estimate of electric motor speed, so that no motor voltage sensor is needed. Advantageously, the control may use separate stored relationships between the pulse width on-time and electric motor voltage for different commutation modes of the pulse width modulated, current switching control.

DESCRIPTION OF THE PREFERRED EMBODIMENT

Figure 1:
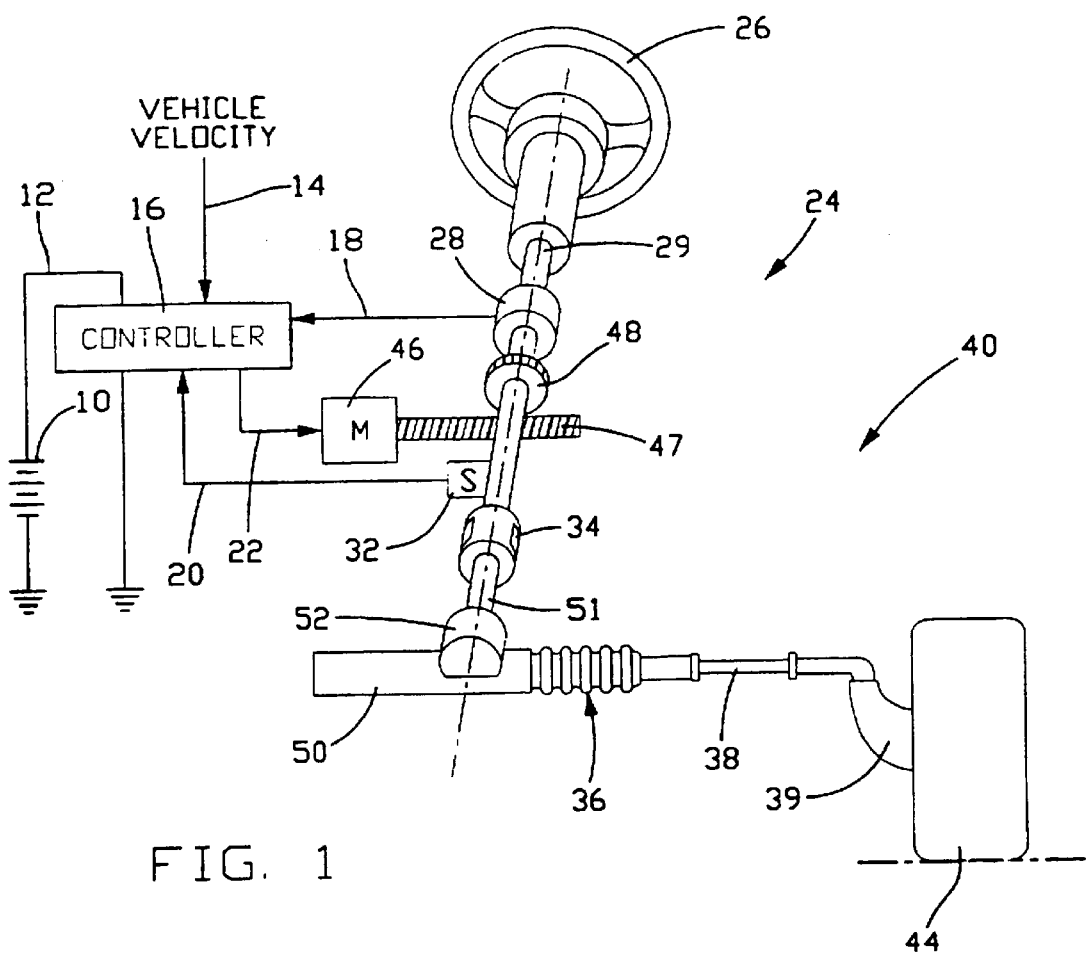
FIG. 1 shows a portion of a motor vehicle having an electric power steering system with apparatus according to this invention.

Referring to FIG. 1, a motor vehicle 40 is provided with an electric power steering system 24. Electric power steering system 24 may comprise a conventional rack and pinion steering mechanism 36, which includes a toothed rack 50 and a pinion gear (not shown) under gear housing 52. As steering wheel 26 is turned, an upper steering shaft 29 turns a lower shaft 51 through a universal joint 34; and lower steering shaft 51 turns the pinion gear. Rotation of the pinion gear moves the rack, which moves the rods 38 (only one shown), which move steering knuckles 39 (only one shown) to tarn wheels 42 (only one shown).

Electric power assist is provided through a controller 16 and a power assist actuator comprising an electric motor 46. Controller 16 receives electric power from a vehicle electric power source 10 through a line 12, a signal representative of the vehicle velocity on line 14, and steering pinion gear angle from a column rotational position sensor 32 on line 20. As steering wheel 26 is turned, a torque sensor 28 senses the torque applied to steering wheel 26 by the vehicle operator and provides an operator torque signal to controller 16 on line 18. In addition, as the rotor of motor 46 turns, rotor position signals for each phase are generated within motor 46 and provided over bus 30 to controller 16. In response to the vehicle velocity, operator torque, steering pinion gear angle and rotor position signals received, controller 16 derives desired motor phase currents and provides such currents through a bus 22 to motor 46, which supplies torque assist to steering shaft 29, 51 through worm 47 and worm gear 48. If torque sensor 28 is the type which requires upper steering shaft 29 to be separated at the sensor between upper and lower sections allowing some range of rotational independence, both rotational position sensor 32 and worm gear 48 are associated with the lower section of the steering shaft, below torque sensor 28 as shown.

Figure 2:
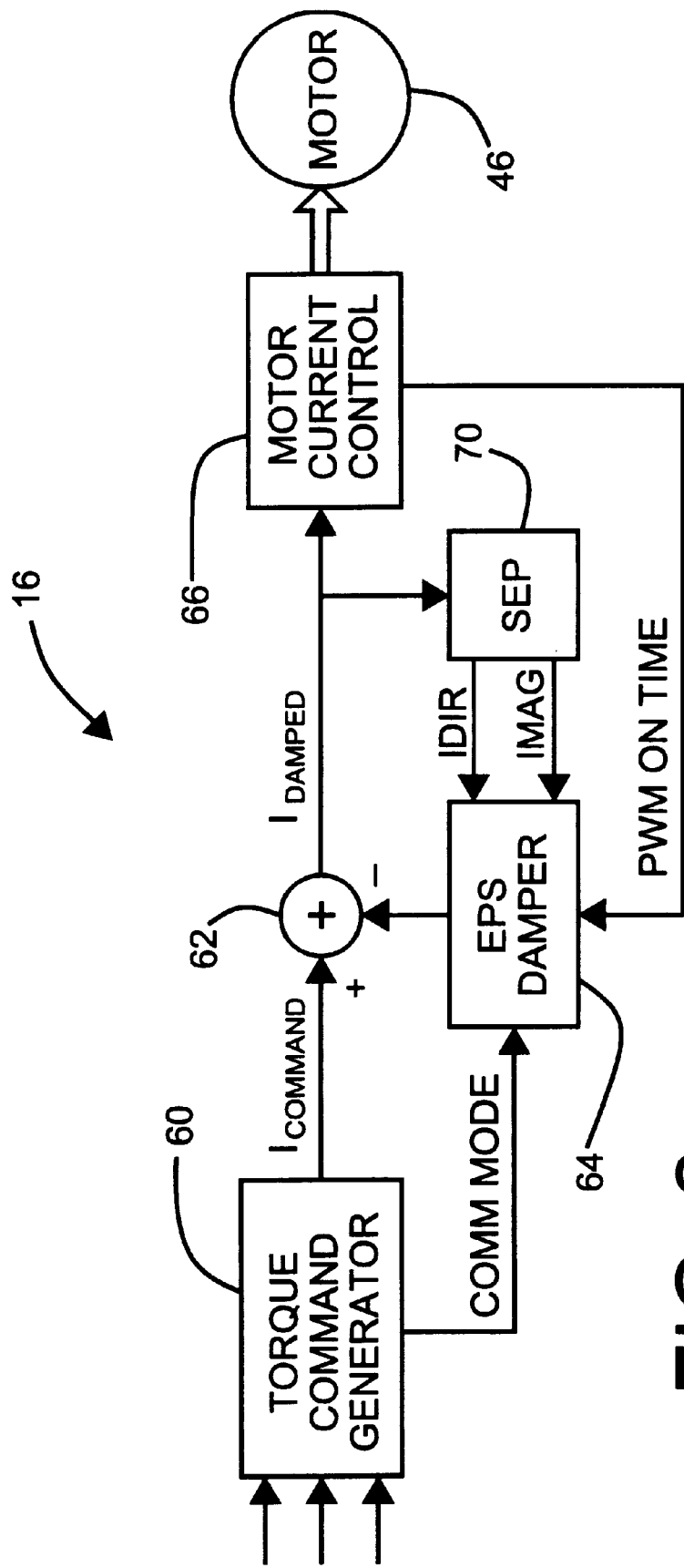
FIG. 2 is a block diagram of a control and actuator of the electric power steering system shown in FIG. 1.

FIG. 2 shows a block diagram of the portion of controller 16 which is modified by this invention. Torque command generator 60 is a known part of the total EPS control that responds to driver input torque and other inputs such as vehicle velocity steering angle to determine a desired assist torque in any suitable manner known in the art. The output $I_{COMMAND}$ of torque command generator indicates the desired torque assist and is provided as an interim output command torque signal to the positive input of a summer 62. Summer 62 also receives, on a negative input, the output of an EPS damper 64, which output indicates a damping correction value to be summed negatively with $I_{COMMAND}$. The output of summer 62—$I_{DAMPED}$—is the output command torque signal for motor 46. It is provided to a motor current control 66 that generates motor terminal voltage(s) producing an electric current in motor 46 equal to $I_{DAMPED}$, and thus a damped torque output therefrom.

EPS damper 64 receives several inputs enabling it to determine the desired damping correction value. The first is a signal containing information from which motor speed can be derived. Such a signal may be obtained from a motor tachometer, but such a sensor providing the required resolution adds considerable expense to the control. An alternative not requiring a motor tachometer is to use the voltage of motor 46 as a signal representing the motor's speed. This signal may be obtained from voltage sensing apparatus, but it is preferred to derive the signal from existing signals without the introduction of any additional sensor. In this embodiment, in which the motor current control provides motor terminal voltage(s) by pulse width modulation (PWM), the PWM on-time is a signal indicative of the commanded motor terminal voltage(s), which can be processed to produce an estimated motor speed signal. Signal PWM ON TIME is thus provided from motor current control 66 as an input to EPS damper 64. In addition, signal $I_{DAMPED}$, which approximates the actual motor current, and thus torque, is separated into its magnitude (IMAG) and direction (IDIR) in a separator 70, with each of signals IMAG and IDIR being provided as inputs to EPS damper 64. Finally, since the embodiment described commutates motor 46 through a semiconductor bridge switching circuit used in multiple switching modes, a commutation mode signal COMM MODE is provided from torque command generator 60. This command is not required to practice the invention in a standard commutation arrangement, in which the commutation mode does not change.

An example of the combination of a suitable motor current control 66 is shown in U.S. Ser. No. 09/099,007, Brushless DC Motor Control Method and Apparatus for Reduced Commutation Noise, filed by Steven J. Collier-Hallman et al Jun. 17, 1998, now U.S. Pat. No. 6,002,220 which reference also shows a torque command generator 75 in FIG. 2 that generates a commanded current signal $I_C$ and a commutation mode signal MODE, which correspond, respectively, to signals $I_{COMMAND}$ and COMM MODE in this application. Summer 62 of this embodiment would be inserted in the bus of FIG. 2 in the Collier-Hallman et al reference that provides the commanded current $I_C$ from control computer 75 to current control 85. More detail of torque command generator 60 is shown in U.S. Pat. No. 5,704,446, Electric Power Steering Control, issued to Chandy et al Jan. 6, 1998.

Figure 3:
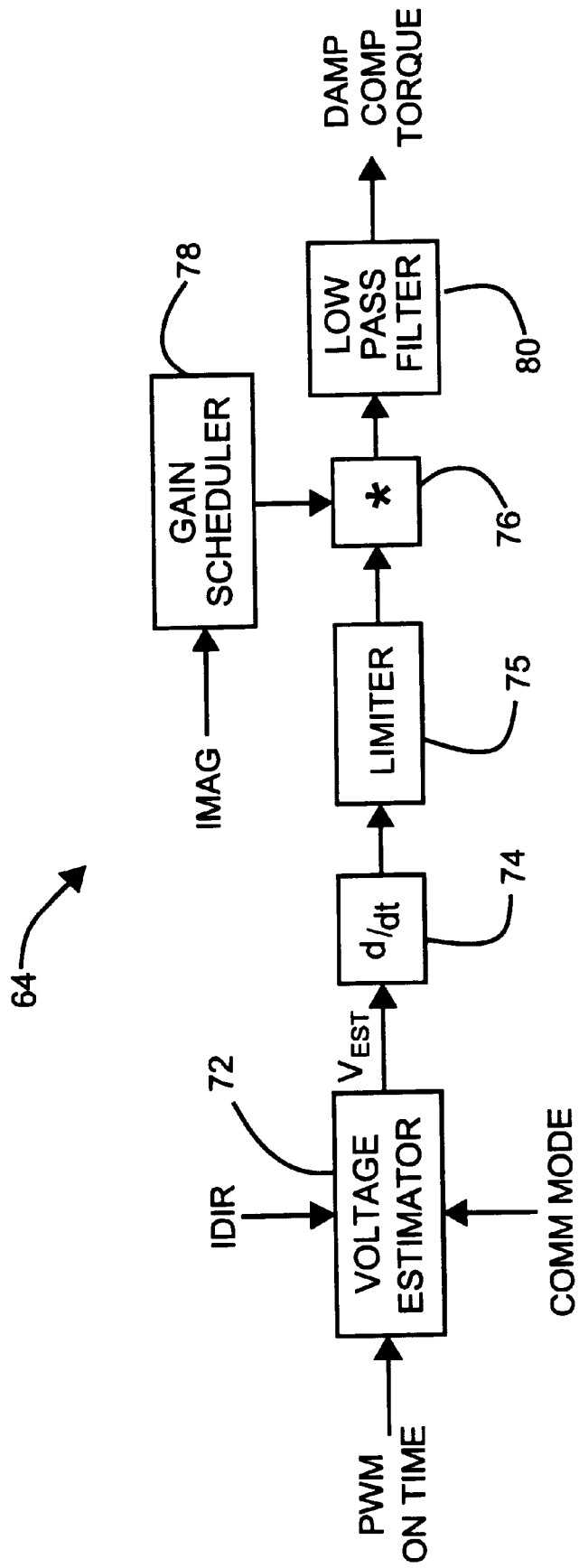
FIG. 3 is a block diagram of an EPS damper for use in the control of FIG. 2.

FIG. 3 shows EPS damper 64 in more detail. Voltage estimator 72 receives signals PWM ON TIME, DIR and, in this embodiment, COMM MODE and derives an estimated voltage signal indicative of the motor terminal voltage(s). This signal is differentiated in differentiator 74. The differentiation eliminates the DC components of the voltage and provides a signal which is highly influenced by the voltage spikes which are associated with torque ripple. The differentiated estimated voltage signal from differentiator 74 is then limited in limiter 75 and scaled by a gain factor in multiplier 76. The gain factor is obtained from a gain scheduler 78 as a function of the magnitude IMAG of $I_{DAMPED}$ in a manner to be described with reference to FIG. 5 at a later point in this description. Essentially, the gain factor increases with the magnitude of $I_{DAMPED}$, since more damping compensation is desired at high torque. The elimination of DC components by differentiator 74 prior to multiplier 76 avoids instability that would result from the presence in the output of such components scaled by the gain factor. The scaled output of mutliplier 76 is provided to a low pass filter 80, which provides anti-aliasing in the digital computer environment and reduces high frequency noise in a manner well known to those of ordinary skill in the art. The output of filter 80 is DAMP COMP TORQUE, the damping compensation torque provided to summer 62 by EPS damper 64. The signal $I_{DAMPED}$ output from summer 62 is thus derived partially in response to the damping correction value DAMP COMP TORQUE to reduce torque ripple and road generated disturbances communicated to handwheel 26.

Figure 4:
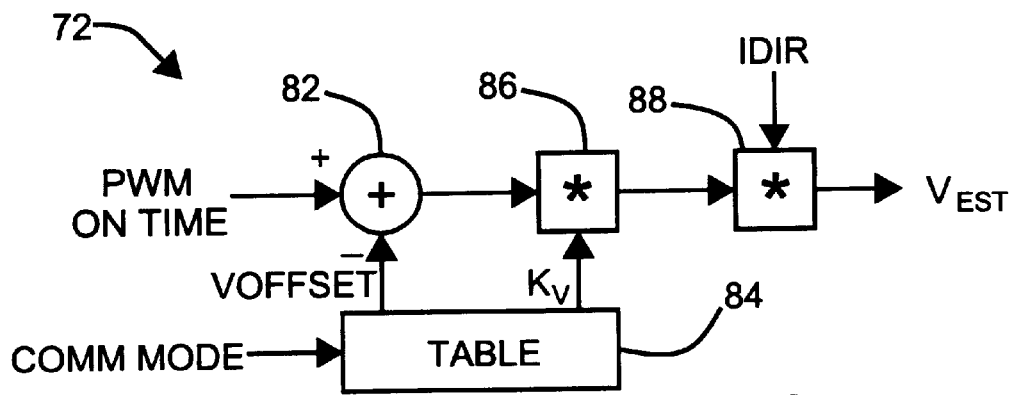
FIG. 4 is a block diagram of a voltage estimator for use in the EPS damper of FIG. 3.

Voltage estimator 72 is shown in more detail in FIG. 4. The voltage is modeled as the output of a linear power supply:

$$V=(K_V)(T_{ON})-VOFFSET$$

wherein $T_{ON}$ is the PWM on-time, $K_V$ is a proportionality constant and VOFFSET is an intercept constant. In a pulse width modulated power supply, the relationship between output voltage and on-time is determined by the commutation mode: i.e. the switching pattern and the electrical parameters of the circuit paths in each switch state. For a particular application, the relationship may be determined by one of ordinary skill in the art from a standard analysis of the switching circuit and mode and expressed in terms of the gain and offset constants. It is possible, however, to use more than one commutation mode, as in the above-identified Collier-Hallman et al reference. In such a system, the relationship, and therefore the constants $K_V$ and VOFFSET, will be different for each commutation mode.

Thus, referring to FIG. 4, the value of ON TIME, which represents the on-time of the PWM duty cycle, is provided as a positive input to a summer 82, which receives as a negative input a the constant value VOFFSET. This value may be derived from a look-up table 84 based on the commutation mode, as identified by the input COMM MODE. The output of summer 82 is provided to a multiplier 86, wherein it is multiplied by the gain constant $K_V$, which is also derived from look-up table 84 based on input COMM MODE. The output of multiplier 86 is provided to another multiplier 88, in which it is multiplied by +1 or −1 based on the input DIR. This is necessary to provide an indication of voltage direction, since ON TIME is an absolute value indicative of voltage magnitude only. The output of multiplier 88 is the estimated voltage $V_{EST}$. Clearly, if a single commutation mode is used, the values of VOFFSET and $K_V$ may be embedded constants with no need for the table lookup.

Figure 5:
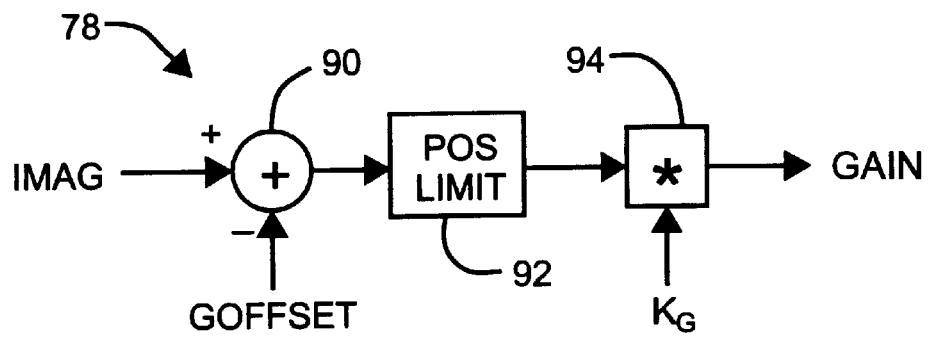
FIG. 5 is a block diagram of a gain scheduler for use in the EPS damper of FIG. 3.
Figure 6:
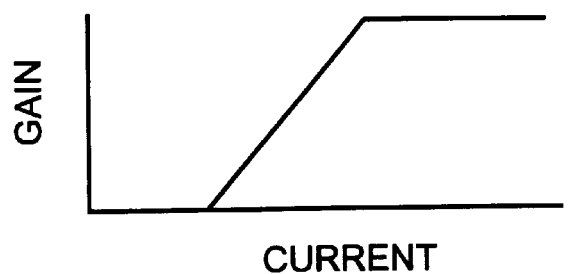
FIG. 6 is a graph showing a representative example of the output of the gain scheduler of FIG. 5.

Gain scheduler 78 is shown in more detail in FIG. 5. Signal IMAG, which represents the magnitude of $I_{DAMPED}$ and thus approximates the magnitude of the current in motor 46, is provided as a positive input to a summer 90. Summer 90 also receives, as a negative input, a predetermined constant gain offset GOFFSET. The output of summer 90 is provided to a positive limit block 92, which limits its output to positive numbers by outputting zero for any negative input. The output of positive limit block 92 is provided to multiplier 94, in which it is multiplied by a predetermined gain constant $K_G$. The output, signal GAIN, varies with motor current, less an offset, as shown in the curve of FIG. 6. The reason for the offset is that, in many systems, the relationship will be invalid at low currents, due to specifics in the operation of the PWM current control. The offset assures that the damping correction is applied only at high currents. The damping correction thus fits well with an electric power steering system, where torque ripple is especially objectionable in situations such as vehicle parking, wherein high steering assist loads, and thus high motor currents, are generated. Torque ripple is not as noticeable in low load conditions such as highway driving.

Figure 7:
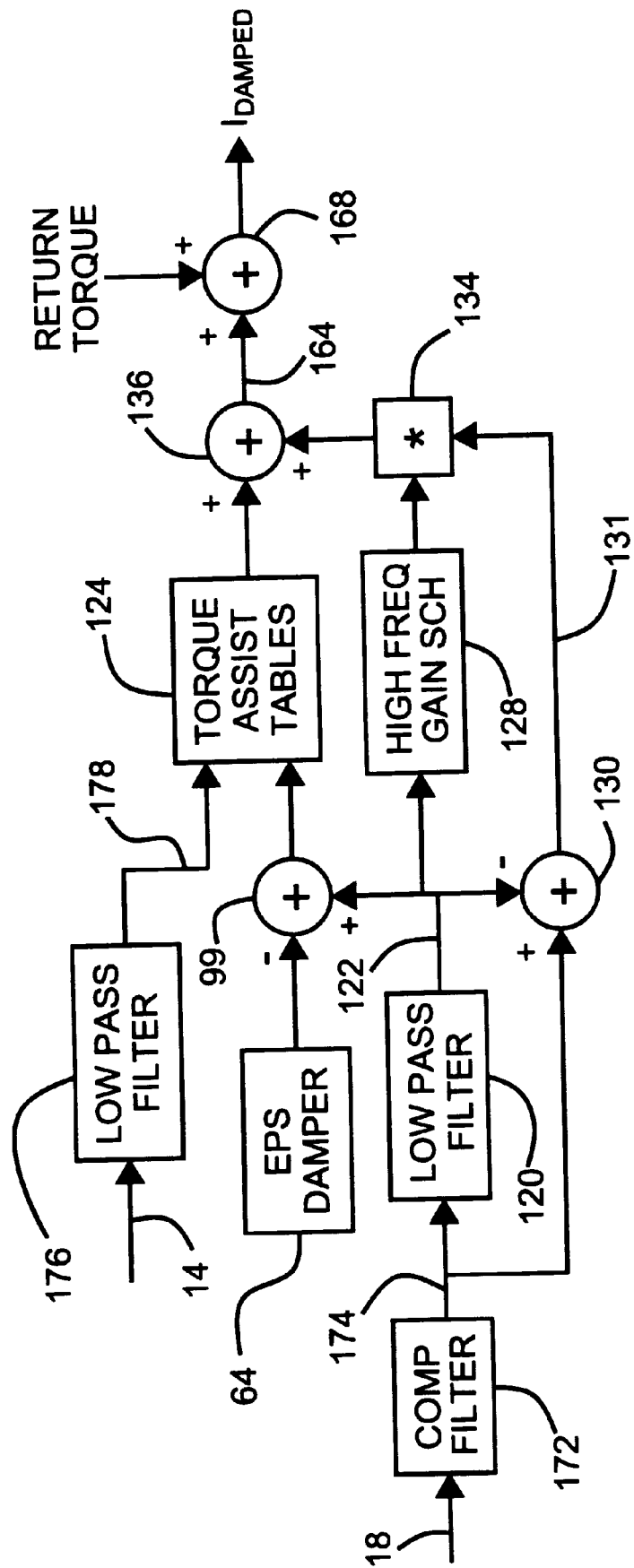
FIG. 7 is a block diagram of an alternative to the apparatus of FIG. 2.
Figure 8A:
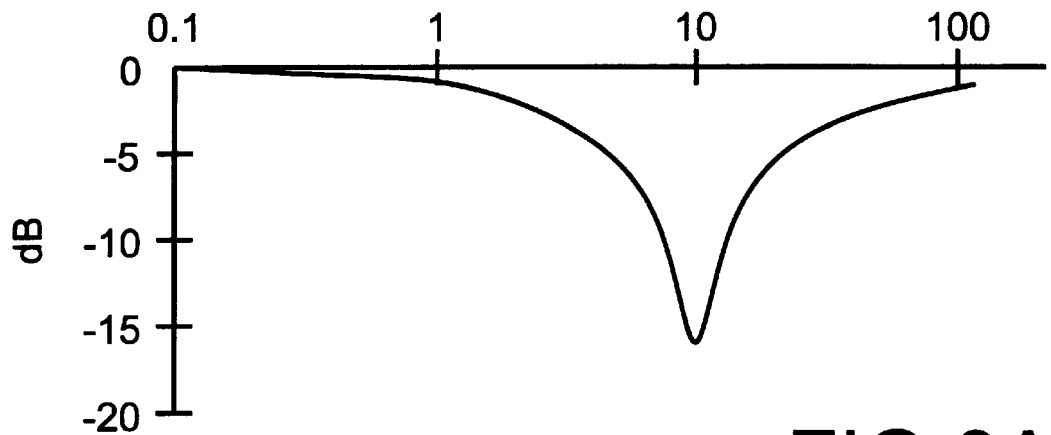
FIG. 8 is a graph of the output of a compensator filter of the prior art which is useful in describing an advantage of the apparatus according to this invention.
Figure 8B:
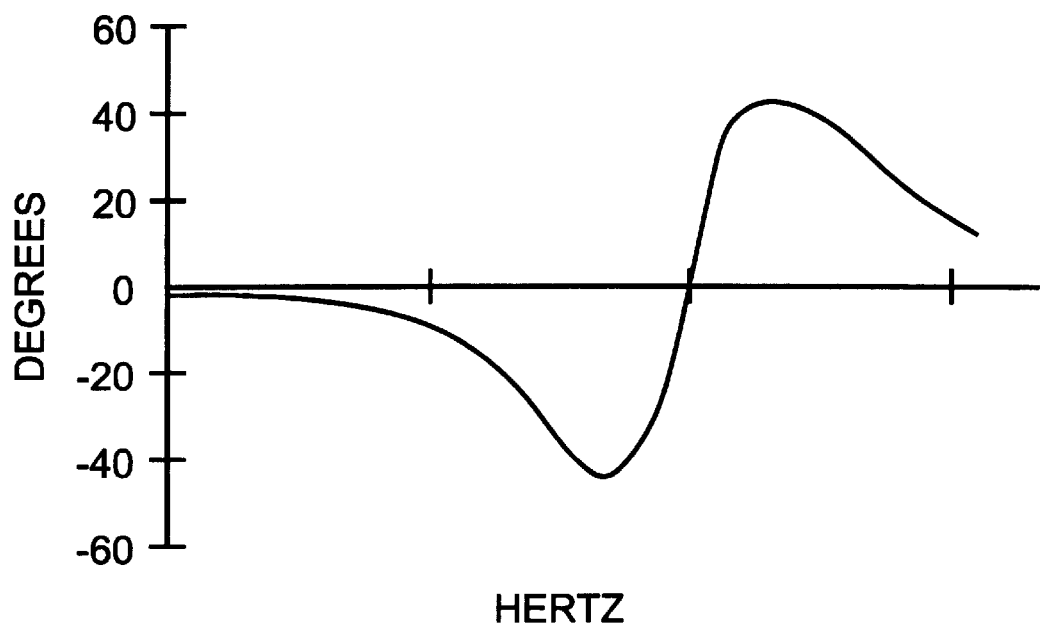

An additional advantage of the apparatus described herein is described with reference to FIGS. 8A and 8B, which describe the amplitude and phase output of a compensator filter for an electric power steering system described in the aforementioned Chandy et al U.S. Pat. No. 5,704,446 and mentioned in the embodiment described below with respect to FIG. 7. The compensation filter increases system stability by providing a notch, seen in the curve of FIG. 8A, at about 10 Hz, the resonant frequency of particularly important parts of the steering system. This reduces power steering assist in this frequency range to increase stability but simultaneously allows an increase in the communication of road generated disturbances at this frequency to handwheel 26. The apparatus of this invention allows the notch to be less aggressive and thus provides a compound improvement in the damping of road generated disturbances: both from the reduction in notch amplitude and in its own damping effect as described herein.

A variation of the control of FIG. 2 is described with reference to FIG. 7. In this embodiment, the output of EPS damper 64 is summed at a different point in the control that is within the torque command generator 60 as shown in FIG. 2. Thus, FIG. 7 shows a portion of a torque command generator according to the Chandy et al U.S. Pat. No. 5,704,446, so that the point of introduction of the signal DAMP COMP TORQUE from torque command generator 64 can be described. The block diagram of FIG. 7 is a combination of the relevant portions of FIGS. 2, 3 and 7 of the Chandy et al patent, with the reference numbers generally 100 higher.

An input handwheel torque signal from torque sensor 28 is provided on line 118 to a compensation filter 172, which is the same compensation filter described above. The output of compensation filter 172 is provided to a low pass filter 120 and to the positive input of a summer 130, which also receives the output of low pass filter 120 on a negative input. The subtraction of the low pass filtered, compensated signal from the compensated signal itself effectively provides a high pass filtered, compensated handwheel torque signal at the output of summer 130 on line 131. The output of low pass filter 120 is also provided to a gain scheduler 128, which derives a gain value for scaling the signal on line 131 in a multiplier 134.

A vehicle speed signal is provided on line 114 to a low pass filter 176, the output of which is provided on line 178 to torque assist tables 124, which store torque assist data as a function of handwheel torque and vehicle velocity. In the Chandy et al system, the low pass filtered, compensated handwheel torque signal is also provided to toque assist tables 124, from low pass filter 120 over a branch of line 122. It is at this point in this embodiment that signal DAMP COMP TORQUE is introduced. A summer 99 is inserted with a positive input receiving the output of low pass filter 120 and a negative input receiving the output of EPS damper 64. The output of summer 99 is provided to torque assist tables 124 so that the assist torque derived from tables 124 is a function of vehicle speed and of handwheel torque compensated both by compensator 172 and by the damping correction value from EPS damper 64. The output of torque assist tables 124 is summed with the output of multiplier 134 in summer 136, the output of which is summed with a return to center torque signal in summer 168 to form output signal $I_{DAMPED}$. Signal $I_{DAMPED}$ is thus derived partially in response to the damping correction value of EPS damper 64 to reduce torque ripple and road disturbance effects communicated to handwheel 26.

The embodiment of FIG. 7 is preferred over that of FIG. 2 essentially because the desired gain of an electric power steering system decreases with vehicle velocity, and this variation in gain is designed into the torque assist tables 124 in FIG. 7 and their equivalent in torque command generator 60 of FIG. 2. In the embodiment of FIG. 7, the application of the damping correction value from damper 64 to the input torque signal used in the access of torque assist tables 124 causes the effect of the damping correction value to be reduced automatically along with that of the input torque signal as vehicle velocity increases, under control of the predetermined values of the data stored in the tables. In the embodiment of FIG. 2, on the other hand, the damping correction value is applied to the output command torque signal derived from the tables. As vehicle velocity increases and causes the amplitude of the output command torque signal to decrease in gain via the table data values, the damping correction value, which is not affected by the stored data in the tables, is not reduced correspondingly. This can produce too much damping at high vehicle velocities, with a resultant heavy, high inertial steering "feel".

It may also be pointed out, with regard to the embodiment of FIG. 7, that damper 64 may be simplified by essentially eliminating gain scheduler 78 of FIGS. 3, 5 and 6, provided that the signal indicating electric motor speed is derived from a motor speed sensor rather than estimated from electric motor voltage. But the savings in software resulting from the elimination of gain scheduler 78 is not generally sufficient to overcome the increased hardware cost of a motor tachometer; and this would thus not normally be a designer's choice unless the motor tachometer were going to be included anyway for other reasons.

What is claimed is:

1. An electric power steering control for a motor vehicle, comprising:

a steerable wheel;

an operator handwheel;

a steering gear linking the steerable wheel to the operator handwheel;

an electric motor coupled to the steering gear;

means for deriving an output command torque signal in response to an operator input torque applied to the handwheel;

for controlling current in the electric motor in response to the output command torque signal to provide steering assist torque;

means for deriving a signal indicating electric motor speed;

means for differentiating the signal indicating electric motor speed;

means for scheduling a gain as an increasing function of electric motor torque; and means for modifying the differentiated signal indicating electric motor speed in response to the gain to provide a damping correction value, the means for deriving an output command signal being additionally responsive to the damping correction value to reduce torque ripple effects in the handwheel generated by the electric motor and road generated torque disturbances introduced to the handwheel through the steerable wheel.

2. The invention of claim 1 in which the signal indicating electric motor speed is an electric motor voltage signal.

3. The invention of claim 2 in which the means for controlling current in the electric motor generates a pulse width modulation on-time signal representing a voltage required to produce a current in the electric motor corresponding to the output command torque signal and an estimated electric motor voltage is derived from the pulse width modulation on-time signal.

4. The invention of claim 3 in which the means for deriving an estimated electric motor voltage stores predetermined data relating the pulse width modulation on-time to the voltage required to produce a current in the electric motor and uses the predetermined data to derive the estimated electric motor voltage.

5. The invention of claim 4 in which the predetermined data comprises an offset datum and a gain datum determining a linear relationship.

6. The invention of claim 4 in which the means for controlling current in the electric motor provides pulse width modulation of electric motor voltage alternatively in at least two commutation modes having different relationships between the pulse width modulation on-time and the voltage required to produce a current in the electric motor corresponding to the output command torque signal, the predetermined data comprises separate data for each of the two commutation modes and the means for deriving an estimated electric motor voltage selects the separate data for the commutation mode in use.

7. The invention of claim 6 in which the separate data for each commutation mode comprises an offset datum and a gain datum determining a separate linear relationship.

8. The invention of claim 1 further comprising, in combination:

means for limiting the differentiated signal indicating electric motor speed prior to modification thereof by the gain;

wherein said signal indicating electric motor speed is an estimated voltage signal; and means for low pass filtering the resulting product of the limited, estimated voltage signal and the gain to provide the damping correction value.

9. The invention of claim 1 in which the damping correction value is restricted to zero below a predetermined value of electric motor torque.

10. The invention of claim 9 in which the means for scheduling a gain stores a gain offset value corresponding to the predetermined value of electric motor torque and provides zero output for input values of electric motor torque below the stored gain offset value.

11. The invention of claim 1 in which the means for deriving an output command torque signal comprises, in combination:

means for storing power assist torque data as a function of handwheel torque and vehicle velocity;

means for providing a vehicle velocity signal;

means for providing a handwheel torque signal;

means for modifying the handwheel torque signal in response to the damping correction value to provide a modified handwheel torque signal;

means for deriving a power assist torque value from the power assist torque data in response to the vehicle velocity signal and the modified handwheel torque signal; and means for deriving the output command torque signal from the power assist torque value.

12. The invention of claim 11 in which the signal indicating electric motor speed is an electric motor voltage signal.

13. The invention of claim 12 in which the means for controlling current in the electric motor generates a pulse width modulation on-time signal representing a voltage required to produce a current in the electric motor corresponding to the output command torque signal and an estimated electric motor voltage is derived from the pulse width modulation on-time signal.

14. The invention of claim 1 in which the means for deriving an output command torque signal comprises, in combination:

means for storing power assist torque data as a function of handwheel torque and vehicle velocity;

means for providing a vehicle velocity signal;

means for providing a handwheel torque signal;

means for deriving a power assist torque value from the power assist torque data in response to the vehicle velocity signal and the handwheel torque signal;

means for deriving an interim command torque signal from the power assist torque value;

means for modifying the interim command torque signal in response to the damping correction value; and means for deriving the output command torque signal from the modified interim command torque signal.

15. The invention of claim 14 in which the signal indicating electric motor speed is an electric motor voltage signal.

16. The invention of claim 15 in which the means for controlling current in the electric motor generates a pulse width modulation on-time signal representing a voltage required to produce a current in the electric motor corresponding to the output command torque signal and an estimated electric motor voltage is derived from the pulse width modulation on-time signal.

* * * * *